United States Patent Office 3,204,174
Patented Aug. 31, 1965

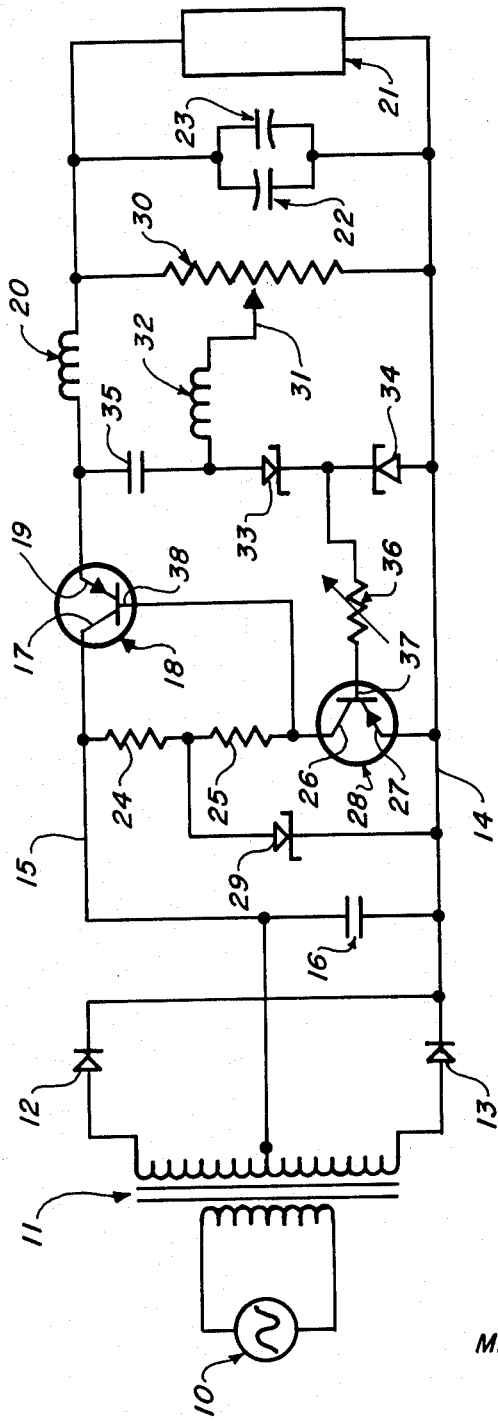
MILTON C. CLERC
INVENTOR.

3,204,174
TUNNEL DIODE VOLTAGE REGULATOR
Milton C. Clerc, Houston, Tex., assignor to Texas Instruments Incorporated, Dallas, Tex., a corporation of Delaware
Filed Aug. 15, 1961, Ser. No. 131,516
5 Claims. (Cl. 323—22)

This invention relates to a voltage regulator and more particularly to a voltage regulator which utilizes the bistable operation and fast switching characteristics of a tunnel diode in conjunction with the reverse characteristics of a Zener diode.

When it is necessary to maintain a constant voltage across a load impedance which may vary in magnitude, the load impedance may be connected to an unregulated supply through a switching device such as a power transistor that is controlled by the load voltage. For example, it is conventional to control the switching device by a circuit including a reference level arrangement such as a Zener diode, the switching device being cut off when the load voltage exceeds the reference level and being cut on when the load voltage is below the reference level. However, if a power transistor is used as the switching device, the control arrangement must have a distinct two-state operation, since excess power dissipation results in the transistor if the transition between full conduction and cut-off is not sharp. Furthermore, the ripple in the load voltage due to the rapid cycling of the switching device may be more easily removed if it is of very high frequency. Voltage regulator circuits heretofore available have not provided rapid switching and positive two-state characteristics which are necessary in some applications where low power dissipation in the switching device and very precise regulation of the output voltage are required.

It is therefore a principal object of this invention to provide an improved voltage regulator circuit of the type utilizing semiconductor devices. Another object is to provide a voltage regulator circuit having a minimum of components for optimum regulating characteristics. A further object of this invention is to make use of the bistable and fast switching characteristics of a tunnel diode along with a Zener diode, as a reference device in a voltage regulator.

In accordance with an illustrative embodiment of this invention, a voltage regulator circuit is utilized which includes a switching transistor connected in series between an unregulated voltage supply and the load. A portion of the load voltage is applied across a series circuit including a Zener diode and a tunnel diode connected in opposition. The voltage across the tunnel diode is used to control another transistor, which has its output connected to the control electrode of the switching transistor. With this arrangement, the extremely fast switching characteristics of the tunnel diode between its low voltage and high voltage stable states, along with the reference level provided by the Zener diode, can be utilized to great advantage in maintaining the average load voltage at some constant value, regardless of the load impedance.

The novel features believed to be characteristic of this invention are set forth in the appended claims. The invention itself, however, along with further objects and advantages thereof, may best be understood by reference to the following detailed description of a particular embodiment, when read in conjunction with the accompanying drawing, wherein:

The single figure is a schematic diagram of a voltage regulator circuit incorporating the principal features of this invention.

With reference to the drawing, there is shown a regulated power supply utilizing a source of alternating current 10 connected across the primary of a transformer 11. The center-tapped secondary of the transformer 11 is connected to a full-wave rectifier arrangement including a pair of diodes 12 and 13. The anodes of the diodes 12 and 13 are connected to the outer terminals of the center-tapped secondary while the cathodes are connected together and to a positive line 14. The center tap of the secondary winding is connected to a negative line 15, while a large smoothing capacitor 16 is connected across the positive and negative lines 14 and 15. The negative D.-C. supply line 15 is connected to the collector electrode 17 of a series transistor 18. The emitter electrode 19 of this transistor is connected through a smoothing inductor 20 to a load 21. A large smoothing capacitor 22 is connected across the load 21 in the forward direction, while a smaller capacitor 23 is connected in a reverse direction across the load. Connected across the unregulated side of the D.-C. supply or across the lines 14 and 15 is a series circuit including a pair of resistors 24 and 25 and the collector and emitter electrodes 26 and 27 of a second transistor 28. The junction of the resistors 24 and 25 is connected to the line 14 by a Zener diode 29, to establish a constant reference level at this junction. Connected across the load 21 on the regulated side of the series transistor 18 is a potentiometer 30, a tap 31 on the potentiometer 30 being connected through an inductor 32 to a series circuit including a Zener diode 33 and a tunnel diode 34, which are connected in opposition. The junction of the inductor 32 and the Zener diode 33 is connected to the emitter 19 through a capacitor 35. The junction of the Zener diode 33 and the tunnel diode 34 is connected through a variable resistor 36 to the base electrode 37 of the transistor 28. The collector electrode 26 of the transistor 28 is connected to the base electrode 38 of the transistor 18 to complete the circuit. It is seen that the potential at the base 38 will be some negative value as established by the Zener diode 29 when the transistor 28 is cut off, and will be approximately the level of the line 14 when the transistor 28 is conducting.

In the operation of the circuit described above, the alternating voltage provided by the source 10 is rectified by the circuit including the diodes 12 and 13 to provide an unregulated pulsating direct voltage across the conductors 14 and 15. Initially, it will be assumed that the transistor 18 is conducting fully and that the transistor 28 is cut off, the tunnel diode 34 being in its low voltage state. The A.C. portion of the emitter 19 voltage is applied to the diode 33 through the capacitor 35. When the D.C. portion of the load voltage, appearing across the potentiometer 30, has increased to a point such that the voltage between the tap 31 and the line 14 exceeds the sum of the breakdown voltage of the Zener diode 33 and the drop across the tunnel diode 34, the tunnel diode will switch very quickly from its low voltage state to its high voltage state as the current peak is exceeded. The drop across the tunnel diode 34 in its high voltage state is adequate to forward-bias the base 37 of the transistor 28 with respect to the emitter 27. The drop between the collector 26 and the emitter 27 is thereby reduced to substantially zero and so the base 38 of the transistor 28 appears at about the potential of the line 14. This back-biases the base-emitter junction of the transistor 18, since the emitter is in series with the load and is therefore more negative than the line 14 by the drop across the load impedance. The transistor 18 is thereby cut off and so the voltage across the potentiometer 30 decreases. When a point is reached such that the voltage between the tap 31 and the line 14 is less than the back voltage across the Zener diode plus the drop across the tunnel diode 34 in its high voltage state, then the tunnel diode will switch very rapidly to its low voltage state. The transistor 28 will then again cut off, allowing the base 38 to return to a potential substantially negative with respect to the emitter 19, cutting on the transistor 18. This cycle will repeat rapidly, at about one megacycle, maintaining the average voltage between the emitter 19 and the line 14 at some level determined by position of the tap 31. The high frequency component appearing on the regulated side of the transistor 18 will be smoothed out by the combination of the inductor 20 and the capacitor 22, so that the voltage appearing across the load 21 will be very smooth and will maintain a substantially constant value, even though the impedance of the load 21 varies over a considerable range. The switching arrangement is isolated from the high value capacitors 22, 23 by the inductor 32 so that switching will be at high frequency.

While the magnitudes and types of the components in the circuit described above will depend upon the particular application, the following specifications are given by way of example:

| | | |
|---|---|---|
| Capacitor 16 | μfd | 4000 |
| Capacitor 22 | μfd | 2000 |
| Capacitor 23 | μfd | 0.33 |
| Capacitor 35 | μfd | 0.1 |
| Inductor 20 | μhy | 8.8 |
| Inductor 32 | μhy | 8 |
| Resistors 24 and 25 | ohms | 40 |
| Resistor 36 | do | 100 |
| Potentiometer 30 | do | 100 |
| Transistor 18 | | 2N511A |
| Transistor 28 | | 2N1038 |
| Zener diode 29 | | 1N2498R |
| Zener diode 33 | | 1N753 |
| Tunnel diode 34 | | 1N653T |

While this invention has been described in terms of an illustrative embodiment, it is not intended that this description be construed in a limiting sense. Various modifications may be made by persons skilled in the art on the basis of this specification, and so it is contemplated that the appended claims will cover any such modifications which fall with the true scope of the invention.

What is claimed is:

1. A voltage regulator comprising a voltage source, a transistor having base, emitter and collector electrodes, a series circuit connected across said source and including a load and the emitter and collector electrodes of said transistor, means for biasing said transistor in a conductive condition, a tunnel diode and a Zener diode connected together in an opposing relationship and across said load, and control means having an input connected across said tunnel diode and having an output connected to said base electrode of said transistor, said control means being adapted to bias said transistor to a cut-off condition when said tunnel diode is in the high voltage condition.

2. A voltage regulator comprising a voltage source, a first transistor having base, emitter and collector electrodes, a first series circuit connected across said voltage source and including the collector and emitter electrodes of said first transistor and a load impedance, a second series circuit connected across said load impedance and including a Zener diode and a tunnel diode connected in an opposing relationship, impedance means connecting the base of said first transistor to the collector of said first transistor, a second transistor having base, emitter and collector electrodes, said base electrode of said first transistor being further connected to a terminal of said voltage source through said collector and emitter electrodes of said second transistor, and means connecting the base of said second transistor to the junction of said tunnel diode and said Zener diode.

3. A voltage regulator comprising a voltage source having first and second terminals, a first transistor having base, emitter, and collector electrodes, said collector electrode of said first transistor being connected to said first terminal of said voltage source, a load impedance connecting the emitter electrode of said first transistor to said second terminal of said voltage source, impedance means connecting the base of said first transistor to a point of reference potential and effective to bias said first transistor toward a conductive condition, a Zener diode and a tunnel diode connected in opposition and across said load impedance, a second transistor having base, emitter and collector electrodes, said base electrode of said first transistor being connected to said second terminal of said voltage source through the collector and emitter electrodes of said second transistor, and means connecting the base of said second transistor to the junction of said tunnel diode and said Zener diode whereby said second transistor will be driven toward a conductive condition and said first transistor will be driven toward a cut-off condition when said tunnel diode is in its high voltage state.

4. In a voltage regulator circuit, a voltage source, a switching device, a load impedance, said voltage source being connected in a closed series circuit with said switching device and said load impedance, said switching device being adapted to control the current in said closed series circuit in response to a voltage applied to a control electrode, a Zener diode and a tunnel diode connected in series opposition across said load impedance, and control means having an input connected to said tunnel diode and having an output connected to said control electrode, said control means being adapted to apply a voltage to said control electrode which has a first value when said tunnel diode is in one operating condition and has a second value when said tunnel diode is in the other operating condition.

5. In a voltage regulator circuit, a voltage source having first and second terminals, a first switching device having input and output terminals and a control electrode, a second switching device having input and output terminals and a control electrode, each of said first and second switching devices being adapted to provide a low impedance between the input and output terminals when a given potential is applied to the control electrode and a high impedance when another given potential is applied to the control electrode, said input terminal of said first switching device being coupled to said first terminal of said voltage source, a load impedance connected between said output terminal of said first switching device and said second terminal of said voltage source, said control electrode of said first switching device being coupled to a source of said given potential and to said output terminal of said second switching device, said input terminal of said second switching device being connected to said second terminal of said voltage source, a device having breakdown characteristics and a device having a characteristic including positive and negative resistance connected in series across said load impedance, and means connecting said last-mentioned device to said control electrode of said second switching device.

References Cited by the Examiner

UNITED STATES PATENTS

| | | | |
|---|---|---|---|
| 2,776,382 | 1/57 | Jensen | 323—22 X |
| 2,912,635 | 11/59 | Moore | 323—22 |
| 3,108,218 | 10/63 | Butler | 323—22 |

OTHER REFERENCES

Control Engineering, "Diode Controls High Power," July 1957, pages 194–199, vol. 4, No. 7.

"Tunnel Diode Switching Circuit," by H. P. Wolf, published in the IBM Technical Disclosure Bulletin, vol. 4, No. 2, July 1961, pages 42 and 43.

LLOYD McCOLLUM, *Primary Examiner.*